Dec. 25, 1956     D. L. MARKUSEN     2,775,421
FLIGHT PATH CONTROL APPARATUS
Filed Jan. 28, 1952
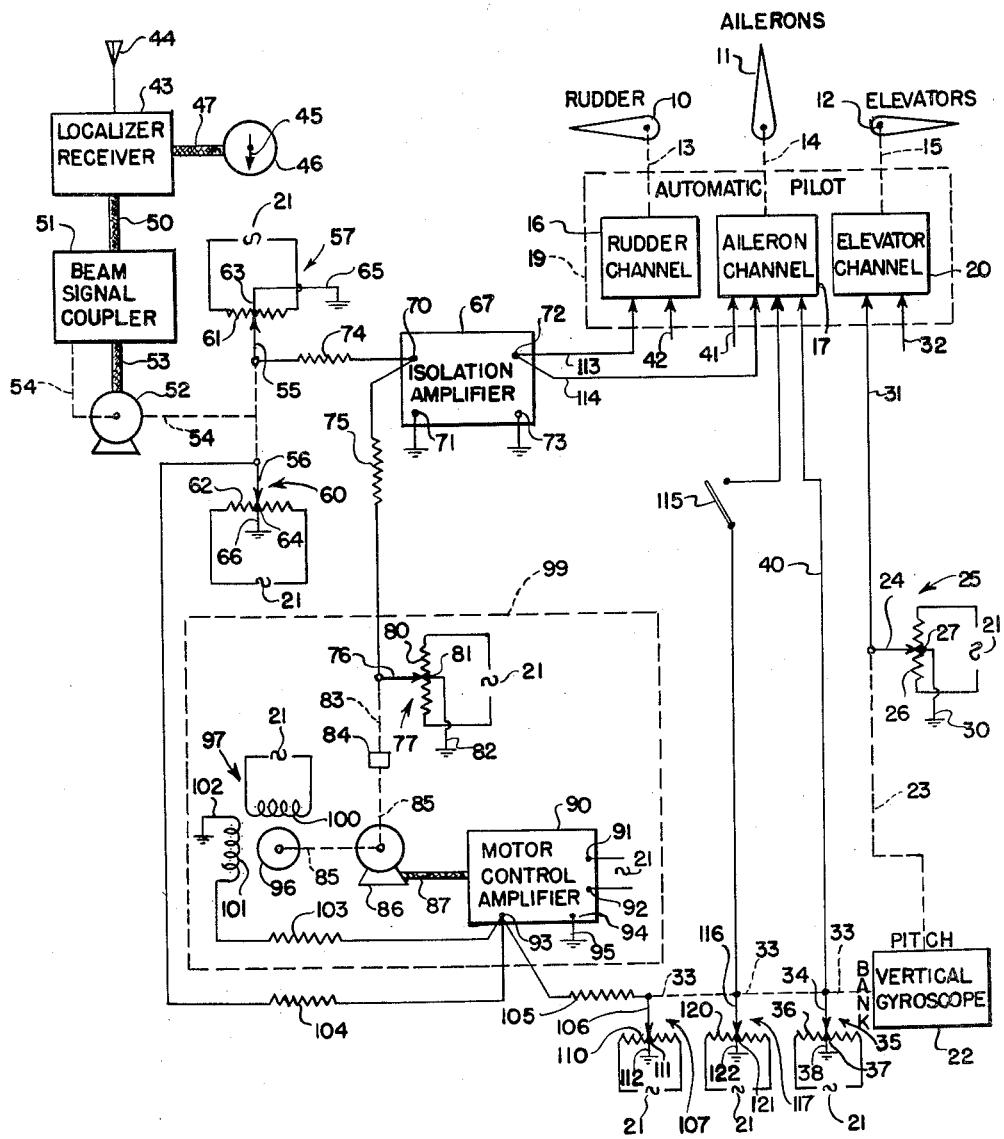
INVENTOR.
DAVID L. MARKUSEN
BY
George H Fisher
ATTORNEY United States Patent Office 2,775,421
Patented Dec. 25, 1956

2,775,421

FLIGHT PATH CONTROL APPARATUS

David L. Markusen, Minneapolis, Minn., assignor to Minneapolis-Honeywell Regulator Company, Minneapolis, Minn., a corporation of Delaware Application January 28, 1952, Serial No. 268,481

14 Claims. (Cl. 244—77)

This invention relates to the field of aeronautics, and more particularly to flight path control apparatus for dirigible aircraft.

Flight path control may be defined as the regulation of the flight of an aircraft so that it moves along a predetermined path with respect to the ground. The path is usually represented by the center line of a radio beam which may be convergent, and signals from radio receiving apparatus carried by the craft are supplied, through a beam signal coupler, to an automatic pilot, thus regulating the heading of the craft to cause it to seek and follow the center of the beam. Vertical flight path control is also known, but is not involved in the present invention.

It has been found that simply supplying the beam coupler signal directly to the turn controlling channels of the automatic pilot results in a system which is subject to some instability. This is because any undesired change of the heading of the craft must continue until it results in lateral displacement of the craft from the path before corrective signals are supplied by the beam signal coupler.

It is possible to correct this imperfection by including in the automatic pilot a compass servo system or a directional gyroscope with a precessing motor or a zero setting motor, but these expedients are very costly both in money and in weight. Since it has been determined that the heading angle of a craft in coordinated turns is the time integral of its bank angle, and since a vertical gyroscope giving pitch and bank outputs is necessary in any automatic pilot, it has been proposed to suitably integrate the bank signal from the vertical gyroscope and use the resulting signal as a correction on the simpler flight path control system just mentioned.

One means of accomplishing this is shown in the copending application of Willis H. Gille, Serial No. 192,477, filed October 27, 1950, and assigned to the assignee of the present invention. In that apparatus the "integration" is to be accomplished by a resistance-capacitance network. Such an integrator requires that the input signals supplied to it be unidirectional rather than alternating, and approximates true integrator operation over only a limited range of such signals. The present invention constitutes an improvement on the prior art not only in accuracy, but in useful range and in simplicity.

The broad object of the invention is to provide an improved flight path control apparatus.

Another object of the invention is to provide such apparatus including an integrator which is more accurate and of greater range than any known in the prior art.

Another object of the invention is to provide such an integrator in which the need for unidirectional voltages has been eliminated.

Yet another object of the invention is to provide such an integrator in which the deficiencies of resistance-capacitance networks have been largely avoided.

A further object of the invention is to provide an alternating current flight path control apparatus in which simplification is obtained by elimination of the usual directional gyroscope, without the need for resistance-capacitance networks and the associated rectifiers and filters.

Various other objects, advantages, and features of novelty which characterize my invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which I have illustrated and described a preferred embodiment of my invention.

The single figure of the drawing is a schematic showing of apparatus by the use of which the objects of the present invention may be accomplished.

In the upper right hand corner of the figure are shown the rudder 10, ailerons 11, and elevators 12 of an aircraft arranged for actuation through mechanical connections 13, 14, and 15, respectively from the rudder channel 16, aileron channel 17, and elevator channel 20 of an automatic pilot generally indicated at 19.

As a normal accessory to the automatic pilot there is provided, as shown in the lower right hand corner of the figure, a vertical gyroscope 22, which acts through a suitable mechanical connection 23 to position the slider 24 of a voltage divider 25 having a winding 26 with a center tap 27 grounded as at 30. Winding 26 is energized from a suitable source 21 of alternating voltage, and accordingly there is provided between slider 24 and ground an alternating voltage signal whose phase and amplitude are determined by the pitch attitude of the aircraft. This voltage comprises a first signal 31 for elevator channel 20 of automatic pilot 19, and the other normal signals for this channel of the automatic pilot are indicated generally at 32. These may be the signals suggested in the copending application referred to above, or such other signals as are desired.

Gyroscope 22 also acts through a further mechanical connection 33 to displace the slider 34 of a voltage divider 35 with respect to a winding 36 having a center tap 37 grounded at 38. Winding 36 is energized from source 21.

It is apparent that there appears between slider 34 and ground an alternating signal voltage determined in phase and amplitude by the roll attitude of the aircraft, and this voltage comprises a first signal 40 for the aileron channel 17 of automatic pilot 19. The other normal signals for aileron channel of the automatic pilot are indicated by the reference numeral 41.

The normal signals for rudder channel 16 of automatic pilot 21 are generally indicated by the reference numeral 42.

In the upper left hand corner of the figure there is shown the localizer receiver 43 of the conventional instrument landing system, having a receiving antenna 44 and energizing the vertical needle 45 of the schematically shown cross pointer indicator 46 through a suitable cable 47. By means of a further cable 50 the output of localizer receiver 43 is also transmitted to a beam signal coupler 51 which operates, as is well known, to energize a motor 52 through a cable 53. One suitable beam coupler is disclosed in the copending application of Alderson et al., Serial No. 49,442, filed September 15, 1948, and assigned to the assignee of the present invention. Motor 52 acts through a mechanical connection 54 to supply a suitable rebalance signal for coupler 51, so that the position of the shaft of motor 52 at any time is representative of the position of the craft with respect to the center of the radio beam. Mechanical connection 54 is extended to the right, as shown in the figure, to drive the sliders 55 and 56 of a pair of further voltage dividers 57 and 60 with respect to windings 61 and 62 having center taps 63 and 64 grounded at 65 and 66, all respectively. The center taps of these voltage dividers are grounded at 65 and 66, and the windings are energized from source 21.

In the center of the figure there is shown an isolation amplifier 67 having input terminals 70 and 71, and output terminals 72 and 73: terminals 71 and 73 are grounded. Slider 55 is connected to input terminal 70 through a summing resistor 74. Also connected to terminal 70, through a summing resistor 75, is the slider 76 of a further voltage divider 77 having a winding 80 energized from source 21 and provided with a center tap 81 grounded at 82.

Slider 76 is actuated, through a mechanical connection 83 and reduction gearing 84, by the shaft 85 of a motor 86. The motor is energized through a cable 87 from the output of a motor control amplifier 90, which is provided with power terminals 91 and 92 energized from source 21, and with input terminals 93 and 94, the latter of which is grounded at 95. Shaft 85 is extended to drive the rotor 96 of a "velocity generator" or dynamic transformer 97 having a primary winding 100 energized from source 21, and a secondary winding 101, of which one terminal is grounded at 102 and the other terminal is connected through a summing resistor 103 to input terminal 93 of motor control amplifier 90. The elements identified above by reference numerals between 76 and 103 inclusive comprise an integrator identified by the general reference numeral 99 and enclosed within the dotted line in the figure.

Velocity generator 97 is a device which supplies at secondary winding 102 a voltage of the frequency of that energizing primary winding 100, which varies in amplitude and reverses in phase with variation in the speed and reversal in the direction of motor 86. Such devices are well known: one such device is shown and described in Riggs Patent No. 2,115,086.

Also connected to input terminal 93, through summing resistor 104, is slider 56 of voltage divider 60.

There is also connected to input terminal 93 of motor control amplifier 90, through a summing resistor 105, the slider 106 of a voltage divider 107 whose winding 110 is center tapped at 111, the center tap being grounded at 112, and the winding being energized from source 21.

The voltage appearing at output terminals 72 and 73 of isolation amplifier 67 comprises a further signal 113 for rudder channel 16 of automatic pilot 19, and a further signal 114 for aileron channel 17 of the automatic pilot. A still further signal for aileron channel 17 is provided, upon closure of a single pole single throw switch 115, from the slider 116 of a voltage divider 117 whose winding 120 is provided with a center tap 121, grounded at 122, and is energized from source 21. Sliders 106 and 116 are actuated simultaneously with slider 34 by a continuation of mechanical connection 33, when the bank attitude of the aircraft changes.

Although primary winding 100 of velocity generator 97, and windings 26, 36, 61, 62, 80, 110 and 120, are all shown as energized directly from source 21, it will be understood that they may be connected for example to different secondary windings on the same power transformer, so that voltages of different amplitudes may be supplied to the various windings in accordance with the relative authority it is desired that they exert in the system.

*Operation*

In describing the operation of the apparatus, it will first be assumed that the craft is at what may be defined as its normal condition. This condition prevails when the craft is in a desired attitude about its roll, pitch, and yaw axes, and when it is located exactly on the center of the radio course to be followed. Under these conditions no signals are supplied to automatic pilot 19 at 32, 41, or 42, sliders 24 and 34 are at the centers of their respective windings so that no signal is supplied to the elevator and aileron channels from these sources, sliders 56 and 106 are at the centers of their respective windings, so that no signal is supplied to motor control amplifier 90 from these sources, and sliders 55 and 76 are at the centers of their respective windings, so that no signals are supplied from these sources to isolation amplifier 67. Isolation amplifier 67 accordingly supplies no signals at 113 and 114 to the rudder and aileron channels of the automatic pilot. This means that the rudder, ailerons, and elevators of the aircraft are in exactly the positions necessary to maintain the craft in flight as desired, if the normal condition of the craft has continued for a sufficient length of time so that the entire system has become stable. Switch 115 is open, but slider 116 is in any event centered.

When the craft departs from the center of the radio beam, a signal is transmitted from receiver 43 to coupler 51, and motor 52 operates to a sufficient extent to balance out, by means actuated through coupling 54, the signal from the receiver, and at the same time to position sliders 55 and 56 with respect to windings 61 and 62.

Integrator 99 operates to supply through summing resistor 75 a voltage which varies as the time integral of the voltages applied to input terminal 93 of motor control amplifier 90 through summing resistors 104 and 105. This is because the effect of these two voltages at input terminal 93 is opposed only by the voltage supplied through summing resistor 103 from velocity generator 97. From this arrangement it results that motor 86 operates at a speed determined by the algebraic sum of the voltages supplied through summing resistors 104 and 105, so that the position of slider 76 at any given instant is a result not only of the magnitudes of the voltages supplied through the summing resistors at that instant, but also of what they have been in previous instants. It will be apparent that the only time when motor 86 is not running is when the voltages supplied through resistors 104 and 105 add up to zero, since at any other time a voltage output from velocity generator 97 is acting in a sense to give speed regulation of motor 86, and slider 76 is simultaneously being adjusted.

When the craft is located exactly on the desired radio course, so that sliders 55 and 56 are both at ground potential, any departure of the craft's bank angle from the desired value, whether due to rough air, roll mistrim of the automatic pilot, or any other cause, can be expected to result in change in the heading of the craft. In the ordinary automatic pilot this is sensed by a suitable directional gyroscope, which gives an output proportional to the increasing heading error. In the present application, on the other hand, the bank angle error results in displacement of slider 106 with respect to winding 110, and a voltage accordingly is supplied through summing resistor 105 to input terminal 93 of amplifier 90. As just described, this results in the appearance through summing resistor 75 of a voltage proportional to the time integral of the bank angle, which has been shown to be proportional in turn to the actual change in heading angle. This signal acts through 113 and 114 to change the rudder and aileron axes of the aircraft in exactly the same fashion as would a directional gyroscope signal if such were available, bringing about a coordinated turn of the aircraft. At the same time the bank angle error has also resulted in displacement of slider 34 from the center of winding 36, and an aileron signal 40 is also supplied to the aileron channel of the automatic pilot. The rudder and ailerons of the aircraft are thus operated to correct for the bank angle error and also for the heading error which has resulted therefrom.

When the bank angle has been completely corrected, sliders 106 and 34 have returned to the centers of their windings, so that as far as the input to the aileron channel indicated at 40 and the input to motor control amplifier 90 supplied through summing resistor 105 are concerned, their values are both zero. However, because of the integrating operation previously described, slider 76 is no longer at the center of winding 80, but is displaced therefrom by an amount proportional to the amount and duration of the bank angle error. This means that a signal is still being supplied to isolation amplifier 67, and signals are being supplied to 113 and 114 to continue causing a coordinated turn of the aircraft. By this means not only is the bank angle error reduced to zero, but the heading error in the craft is also reduced to zero, since the input to isolation amplifier 67 continued until slider 76 has been returned to its central position, and this can take place only in response to a signal of the opposite sense supplied through summing resistor 105 as a result of banking of the aircraft in the opposite direction.

From the foregoing description it will be apparent that the signal supplied from slider 106 is effective on the rudder and aileron channels of the automatic pilot in exactly the same fashion as would be a signal from a directional gyroscope, if such were available, and the arrangement has been provided with that specific purpose in mind. It has also been found necessary, however, when operating an automatic pilot in accordance with signals from a radio receiver, to provide means for precessing a directional gyroscope to correct for changes in cross wind, or permanent mistrim in the aileron axis of the aircraft, which become operative after the radio beam following condition of the apparatus as a whole has been established.

Precession of a directional gyroscope can be shown to have the integrating effect, in the operation of an aircraft control system, of integrating the beam error signal, and therefore, where, as in the present application, it is desired to provide a substitute for directional gyro precession, some form of integration must again be used. Integrator 99 has already been provided for integrating the bank angle error, to give heading error: the same integrator may be used to modify the off-track error signal, to give the effect of a gyro precession signal. To this end the output from slider 56 is supplied to terminal 93 of integrator 99 through summing resistor 104, so that its effect is cumulative with the effect of the voltage supplied through summing resistor 105, and is integrated simultaneously therewith. The voltage appearing at the output of the integrator through summing resistor 75 is therefore no longer simply a voltage representative of the heading of the aircraft, but a voltage representative of the heading of the aircraft as modified by the time integral of the error in the radio signal. The over-all voltage supplied to input terminal 70 through summing resistor 75 is therefore the equivalent of the voltage which would be supplied by a precessed directional gyroscope under the same conditions of flight.

To the voltages described there is added, through summing resistor 74, a further voltage proportional to the displacement of the craft from the center of the radio beam. The similarity between the present apparatus and former apparatus using a precessed directional gyroscope and a beam coupler similar to unit 51 in the present figure is now complete, and outputs 113 and 114 modify the operation of the rudder and aileron channels of the automatic pilot in the fashion described in the prior art. It will be observed particularly, however, that this has been accomplished without requiring any unidirectional voltage sources, or any resistance-capacitance rate networks, so that the only limitation on the maximum amount of operation of the integrator is found in the physical extent of winding 80. By making use of the presently available voltage dividers with extended helical windings, the range of operation of integrator 99 may be extended greatly over ranges available through former expedients.

Apparatus such as that described may be used in aircraft either to follow an omnidirectional range beam or to follow an instrument landing system beam. In the former case the aircraft is proceeding at cruising speed, while in the latter case its speed has been reduced for landing. It is well known that the effect of control surfaces, particularly ailerons, falls off considerably as airspeed is reduced. Therefore, when the system is being used at low airspeeds the human pilot may close switch 115, thus adding a further signal in the aileron channel of the automatic pilot and compensating for the loss in effectiveness of the ailerons at low speeds. When the apparatus is being used at cruising speeds, switch 115 may be left open.

In describing the operation of the apparatus, it was assumed that at the outset slider 76 is located at the center of winding 80, and in practice some form of automatic centering of this slider will be desirable. Such expedients are well known: for example centering springs may be provided on slider 76 and a clutch may be interposed between the slider and shaft 83 energizable to engage the slider and move it against the opposition of the springs whenever amplifier 90 is energized.

From the foregoing description it will be apparent that I have devised new and improved apparatus for controlling the flight path of an aircraft particularly in azimuth. The arrangement replaces the more expensive, bulky, and heavy precessed directional gyroscope, and yet is free from the limitations usually present in integrating devices and associated with the necessity for unidirectional voltages and for resistance-capacitance networks of limited capability.

Numerous objects and advantages of my invention have been set forth in the foregoing description, together with details of the structure and function of the invention, and the novel features thereof are pointed out in the appended claims. The disclosure, however, is illustrative only, and I may make changes in detail, within the principle of the invention, to the full extent indicated by the broad general meaning of the terms in which the appended claims are expressed.

I claim as my invention:

1. Flight path control apparatus comprising, in combination: means for giving a first signal in accordance with lateral deviation of a craft from a desired path; means for giving a second signal in accordance with the angular deviation of the craft from a desired roll attitude; motor-generator means connected to both the above named means for integrating the sum of said first and second signals to give a third signal; and means connected to said motor-generator means and to the first named means for changing the heading of the craft in accordance with the joint effect of said third and first signals.

2. Flight path control apparatus comprising, in combination: means for giving a first signal in accordance with the amount and sense of the lateral displacement of a craft from a desired path; means for giving a second signal in accordance with the amount and sense of the angular displacement of the craft from a desired roll attitude; motor generator means giving a third signal in accordance with the time integral of the sum of said signals; and means connected to all the above named means for changing the heading of the craft in accordance with said signals.

3. Flight path control apparatus comprising, in combination: means for giving a first alternating voltage whose phase and amplitude are determined by the direction and amount of the lateral displacement of a craft from a desired path; means for giving a second alternating voltage whose phase and amplitude are determined by the direction and magnitude of the angular displacement of the craft from a desired roll attitude; means including a motor generator giving a third alternating voltage determined in phase and amplitude by the time integral of the amplitude of the algebraic sum of said first and second alternating voltages; and means connected to all the above named means for changing the heading of the craft in accordance with said first and third alternating voltages.

4. Apparatus of the class described comprising, in combination: adjustable means for supplying an alternating output voltage of continuously variable amplitude and reversible phase; motor means connected to adjust said adjustable means; motor control means including a generator driven by said motor means for causing operation of said motor at a speed and in a direction determined by the amplitude and phase of an input alternating voltage; first responsive means for supplying a first alternating signal voltage which varies in amplitude and reverses in phase with the amount and sense of the displacement of a craft from a desired path; second responsive means for supplying a second alternating signal voltage which varies in amplitude and reverses in phase with the amount and sense of the angular displacement of the craft from a zero bank angle; means connected to said motor control means and to the two last named means for combining said signal voltages to comprise an input alternating voltage for said motor control means, the arrangement being such that when the craft is on the desired path and is in a wing-level roll attitude, said output voltage is zero; and means connected to said adjustable means and to said second responsive means for adjusting the heading of the craft in accordance with said output voltage.

5. Flight path control apparatus comprising, in combination: means for giving a first signal in accordance with lateral deviation of an aircraft from a desired path; means for giving a second signal in accordance with angular deviation of the aircraft from a desired roll attitude; adjustable means for supplying a continuously variable third signal; motor means adjusting said adjustable means; motor control means including a generator driven by said motor means causing operation of said motor means at a speed and in a direction determined by the magnitude and sense of an input thereto; means combining said first and second signals and applying them to said motor control means as an input therefor; and means connected to said adjustable means for changing the heading of the craft in accordance with said first, second and third signals.

6. Flight path control means comprising, in combination: means for giving a first alternating signal voltage of which the phase and amplitude are determined by the direction and amount of the lateral deviation of an aircraft from a desired path; means for giving a second alternating signal voltage of which the phase and amplitude are determined by the direction and amount of the departure of the craft from a desired roll attitude; adjustable means supplying a third alternating signal voltage the amplitude of which may be varied through a zero point of phase reversal; motor means adjusting said adjustable means; motor control means including a generator driven by said motor means causing operation of said motor means at a speed and in a direction determined by the amplitude and phase of an alternating input voltage; means combining said first and second voltages to comprise said alternating input signal voltage; and means connected to said adjustable means for changing the heading of the aircraft in accordance with said first, second and third voltages.

7. Flight path control means comprising, in combination: means for giving a first alternating signal voltage of which the phase and amplitude are determined by the direction and amount of the lateral deviation of an aircraft from a desired path; means for giving a second alternating signal voltage of which the phase and amplitude are determined by the direction and amount of the departure of the craft from a desired roll attitude; adjustable means supplying a third alternating signal voltage the amplitude of which may be varied through a zero point of phase reversal; motor means adjusting said adjustable means; motor control means including a generator driven by said motor means causing operation of said motor means at a speed and in a direction determined by the amplitude and phase of an alternating input voltage; means supplying said second signal voltage to comprise said input voltage for said motor control means; and means connected to said adjustable means for changing the heading of the aircraft in accordance with said first and third signal voltages.

8. Flight path control apparatus comprising, in combination: means for giving a first signal in accordance with the amount and sense of the lateral displacement of a craft from a desired path; means for giving a second signal in accordance with the amount and sense of the angular displacement of the craft from a preselected roll attitude; means including a motor generator giving a third signal in accordance with the time integral of the sum of said signals; and means connected to all the above named means for changing the heading of the craft in accordance with the joint effect of said first and third signals.

9. Flight path control apparatus comprising, in combination: means for giving a first signal in accordance with the amount and sense of the lateral displacement of a craft from a desired path; means for giving a second signal in accordance with the amount and sense of the angular displacement of the craft from a preselected roll attitude; means including a motor generator giving a third signal in accordance with the time integral of the sum of said signals; and means connected to all the above named means for changing the heading of the craft in accordance with the joint effect of said second and third signals.

10. Flight path control apparatus comprising, in combination: means for giving a first signal in accordance with lateral deviation of an aircraft from a desired path; adjustable means for supplying a continuously variable second signal; motor means adjusting said adjustable means; motor control means including a generator driven by said motor means causing operation of said motor means in a direction determined by the magnitude and sense of an input thereto for as long as said input persists; means supplying said first signal to said motor control means as an input therefor; and means connected to said adjustable means for changing the heading of the craft in accordance with said first and second signals.

11. Flight path control apparatus comprising, in combination: means for giving a first signal in accordance with lateral deviation of an aircraft from a desired path; means for giving a second signal in accordance with angular deviation of the aircraft from a desired roll attitude; adjustable means for supplying a continuously variable third signal; motor means adjusting said adjustable means; motor control means including a generator driven by said motor means causing operation of said motor means at a speed and in a direction determined by the magnitude and sense of an input thereto; means supplying said second signal to said motor control means as an input therefor; and means connected to said adjustable means for changing the heading of the craft in accordance with said first and third signals.

12. Flight path control apparatus comprising, in combination: means for giving a first signal in accordance with lateral deviation of an aircraft from a desired path; means for giving a second signal in accordance with angular deviation of the aircraft from a desired roll attitude; adjustable means for supplying a continuously variable third signal; motor means adjusting said adjustable means; motor control means including a generator driven by said motor means causing operation of said motor means at a speed and in a direction determined by the magnitude and sense of an input thereto; means supplying said first and second signals to said motor control means as inputs therefor; and means connected to said adjustable means for changing the heading of the craft in accordance with said first and third signals.

13. Flight path control apparatus comprising, in combination: means for giving a first signal in accordance with lateral deviation of a craft from a desired path; means for giving a second signal in accordance with angular deviation of the craft from a desired roll attitude; motor generator means connected to both the above named means for integrating the sum of said first and second signals to give a third signal; automatic pilot means for actuating the ailerons and rudder of the craft; and means connected to said motor generator means, said first named means, and said automatic pilot for causing operation of the ailerons of the craft through said automatic pilot to change the heading of the craft in accordance with the joint effect of said third and first signals.

14. Flight path control apparatus comprising, in combination: a first pair of energized voltage dividers; means adjusting said voltage dividers to supply voltages determined by the displacement of a craft from a desired path; a second pair of energized voltage dividers; means adjusting said voltage dividers to supply voltages determined by the departure of the craft from a desired roll attitude; an integrator giving an output which is the time integral of a variable input voltage supplied thereto; means connecting one of the voltage dividers of each of said pairs to said integrator so that the input thereto is influenced jointly by said displacement and said departure; an automatic pilot including means for controlling the ailerons of the craft in accordance with an input signal to change the direction of movement of the craft; and means connecting the other voltage divider of each of said pairs, and said integrator output, to said automatic pilot for jointly determining the extent of operation of the ailerons of the craft.

References Cited in the file of this patent

UNITED STATES PATENTS

| | | |
|---|---|---|
| 1,966,170 | Greene | July 10, 1934 |
| 2,400,701 | Meredith | May 21, 1946 |
| 2,513,537 | Williams | July 4, 1950 |
| 2,548,278 | Wirkler | Apr. 10, 1951 |
| 2,575,890 | Perkins et al. | Nov. 20, 1951 |
| 2,576,135 | Moseley | Nov. 27, 1951 |